United States Patent Office 2,763,636
Patented Sept. 18, 1956

2,763,636

METHOD OF CONTROLLING MOLECULAR WEIGHT OF POLYACRYLONITRILE PRODUCED IN AQUEOUS SALT SOLUTIONS

Clyde W. Davis, Antioch, Calif., assignor to The Dow Chemical Company, Midland, Mich., a corporation of Delaware No Drawing. Application August 25, 1952,
Serial No. 306,310

4 Claims. (Cl. 260—88.7)

This invention relates to a method of controlling the molecular weight of the polymer obtained when acrylonitrile is polymerized in an aqueous saline medium which dissolves both the monomer and the polymer.

It is known that acrylonitrile may be polymerized in concentrated aqueous solutions of certain salts to form solutions of the polymer, and that the polymer solutions may be used to spin fibers. The salt solutions which may be used include the zinc halides, stannic halides, and the calcium or sodium thiocyanates, as disclosed in the art. In addition, some solutions of mixed salts can be used in which one salt is capable at higher concentrations of dissolving the polymer and the other salt is incapable alone of dissolving the polymer at any concentration of that salt in water. Examples of such useful mixtures include zinc chloride and lesser amounts of calcium chloride, zinc chloride and lesser amounts of magnesium chloride, zinc bromide and lesser amounts of lithium chloride, sodium thiocyanate and lesser amounts of potassium thiocyanate, as described by the present inventor and others in copending application Serial No. 228,752, filed May 28, 1951, now U. S. Patent No. 2,648,647. The salt concentration in the useful solutions, as shown in said patent, must be at least 55 per cent but need not exceed 65 per cent, by weight.

In carrying out the polymerization of acrylonitrile in aqueous salt solutions, it is observed that the rate of polymerization varies in a seemingly erratic manner from batch to batch, and that the molecular weight of the polymer obtained is correspondingly inconsistent. This anomalous condition persists despite careful duplication of the concentrations of the saline medium, monomer, and catalyst and of the reaction temperature. For a polymerization process to be commercially acceptable, it must give consistent results and conditions must be known which will yield a product whose molecular weight is in any desired range. This is especially true in the case of polymerization processes intended to produce a fiber-forming polymer, as the fiber characteristics depend to a large extent on the chain length of the polymer employed and upon the viscosity of the spinning solution. The method used in the past for preventing the formation of extremely large molecules has involved introduction of mercaptans or of unsaturated compounds which are copolymerizable with acrylonitrile and which serve as "chain stoppers." Such organic agents necesarily alter the chemical characteristics of the polymer as well as its molecular weight, and such alteration is not always considered desirable.

It is accordingly the principal object of the present invention to provide a method whereby the polymerization of acrylonitrile in aqueous saline media may be effected so as to give consistently reproducible results. A related object is to provide a method whereby the molecular weight of the polymer obtained may be controlled at will within reasonable limits.

According to the present invention, the foregoing and related objects are attained through control or adjustment of the concentration of copper ions in the saline polymerization medium. More specifically, it is found that, to obtain polymers with molecular weights controlled in the range from 12,000 to 125,000, the saline medium should contain correspondingly from 1.0 to 0.02 part of copper ions per million parts by weight of the salt solution. Similarly, the most generally useful polymers, having molecular weights in the range from about 20,000 to about 70,000 are obtained consistently when there is present in the saline medium from about 0.5 to about 0.03 part of copper ions per million parts of the salt solution.

It has been found that, of the commonly occurring impurities in zinc chloride, copper is the only one having any significant adverse effect on polymerization rate and molecular weight. This is illustrated in the following table. In each test, a 60 per cent solution of zinc chloride in water was used. The solutions were adjusted to the neutral point for zinc chloride, to make them substantially free from zinc oxide and from excess hydrogen chloride. The zinc chloride was fairly pure, but contained a few tenths of a part of copper per million parts by weight of the solution. The amount of copper present in the zinc chloride solutions was too little to prevent polymerization but was sufficient to keep the molecular weight of the polymer near 30,000 when no other impurities were present. The test ion was added to the zinc chloride solution in an amount representing 5 parts of that ion by weight per million parts of the solution. One part by volume of acrylonitrile monomer was dissolved in six volumes of the so-modified salt solution, and 1 per cent by weight of potassium persulfate, based on the weight of monomer, was used in each case as the catalyst. Polymerization was effected at 50° C. After a fixed period, the viscosity of the resulting polymer solution was measured, the percent polymer solids in the solution was determined, and a sample of the polymer was dissolved to form a standard solution in dimethyl formamide and its molecular weight was calculated from the specific viscosity of the standard solution, using the equation and constant given by Houtz in the Textile Research Journal, vol. 20, page 786 (1950).

TABLE I

| Contaminating ion | Viscosity of Polymer solution at 50° C., Poises | Percent Polymer in zinc chloride solution | Molecular Weight of Polymer |
|---|---|---|---|
| None | 125 | 7.56 | 31,800 |
| $Mn^{++}$ | 115 | 7.36 | 29,400 |
| $NH_4^+$ | 85 | 7.16 | 30,000 |
| $Pb^{++}$ | 105 | 7.34 | 30,500 |
| $Co^{++}$ | 102 | 7.42 | 39,500 |
| $Cu^{++}$ | 0.7 | 3.80 | 4,100 |
| $Fe^{+++}$ | 75 | 7.51 | 32,000 |
| $Sb^{+++}$ | 95 | 7.13 | 35,000 |
| $NO_2^-$ | 110 | 7.77 | 34,500 |

None of the added ions, except that of copper, adversely affected the polymerization rate at the concentration employed, as may be noted from the consistent production of solutions of nearly the same concentration as that found in the blank. Each of those solutions was of a practical spinning viscosity, except when copper was present, and the polymer recovered from each of the solutions had a molecular weight of the same order of magnitude as that made in the original zinc chloride, except that made in the solution containing 5 parts per million of the cupric ion as an impurity.

In further series of determinations, it was learned that the molecular weight of the polymer and the viscosity of the saline solution of the polymer could each be varied and controlled at will by variation and control of the concentration of cupric ion in the saline medium used during polymerization. This is illustrated in the following typical examples in each of which the salt solutions employed had been especially purified to free them initially from all detectable copper (below 0.01 part per million) and had been adjusted to the zinc chloride neutral point. Controlled amounts of copper (as cupric chloride) were added to portions of the solutions, and the effects of the copper were noted by determination of the molecular weights of the several polymer samples.

Example 1

Acrylonitrile was polymerized at 50° C. in each of several 60 per cent solutions of zinc chloride in water and in the presence of 0.15 per cent by weight of hydrogen peroxide based on the weight of monomer. The solutions contained the indicated concentrations of cupric ion.

| Parts per million of $Cu^{++}$ in solution | Average Molecular Weight of Polymer |
|---|---|
| <0.01 | >130,000 |
| 0.05 | 86,000 |
| 0.058 | 82,000 |
| 0.1 | 65,000 |
| 0.2 | 45,000 |
| 0.25 | 40,000 |
| 0.3 | 35,000 |
| 0.35 | 31,000 |
| 0.4 | 28,000 |
| 0.48 | 20,700 |
| 0.69 | 17,500 |
| 1.0 | about 13,000 |
| 5.0 | about 5,200 |

Example 2

The procedure and conditions of Example 1 were followed except that the polymerization medium was a solution in water of 45 per cent zinc chloride and 15 per cent calcium chloride.

| Parts per million of $Cu^{++}$ in solution | Average Molecular Weight of Polymer |
|---|---|
| <0.01 | 130,000 |
| 0.035 | 59,000 |
| 0.2 | 43,000 |
| 0.25 | 28,000 |
| 0.3 | 26,500 |
| 0.5 | about 17,000 |
| 1.0 | about 12,000 |
| 5.0 | about 4,200 |

Example 3

Acrylonitrile was polymerized at 50° C. in each of several solutions in water of 45 per cent zinc chloride and 15 per cent magnesium chloride, using 1 per cent of potassium persulfate as catalyst, based on the weight of monomer. The effect of variation of copper ion concentration was observed as before.

| Parts per million of $Cu^{++}$ in solution | Average Molecular Weight of Polymer |
|---|---|
| 0.017 | over 150,000 |
| 0.02 | about 125,000 |
| 0.03 | 70,000 |
| 0.05 | 43,000 |
| 0.1 | 29,000 |
| 0.15 | 23,000 |
| 0.20 | 20,000 |
| 0.25 | 17,000 |
| 0.35 | 14,000 |
| 0.50 | 12,000 |
| 1.0 | 8,000 |
| 2.5 | 4,800 |
| 5.0 | 3,200 |
| 7.5 | 2,600 |
| 10.0 | 2,200 |

It is to be understood that, owing to differences in analytical procedures, both as to copper concentration and as to molecular weight determination, it should not be expected that the precise values given in the examples will be obtained each time the work is repeated. The results will be of the same order, however, and it is believed that the desirability of limiting the copper concentration between 0.02 and 1 part per million, and preferably between 0.03 and 0.5 part per million, will be readily apparent.

Similarly, when acrylonitrile was polymerized at various volume ratios of monomer to salt solution, using the same mixture of zinc chloride and magnesium chloride as in Example 3, the viscosity of the resulting solutions varied as follows with the cupric ion content of the medium.

TABLE II

| Concentration $Cu^{++}$, parts per million | Viscosity of polymer solution, poises, at 50° C. | | |
|---|---|---|---|
| | $\frac{\text{Salt sol.}}{\text{Monomer}}=6$ | $\frac{\text{Salt sol.}}{\text{Monomer}}=7$ | $\frac{\text{Salt sol.}}{\text{Monomer}}=8$ |
| 0.0 | over 1,000 | 650 | about 210 |
| 0.05 | 560 | 230 | 80 |
| 0.10 | 200 | 92 | 33 |
| 0.15 | 80 | 34 | 18 |
| 0.20 | 28 | 14 | |

Thus, by control of the copper ion concentration in a salt solution used as the medium for polymerizing acrylonitrile, in which zinc chloride is the principal solute, it is possible to control the molecular weight of the polymer within practical limits and, when using such polymerization media, it is possible to obtain a polymer solution of any desired spinning viscosity through selection of the appropriate initial ratio of monomer to the salt solution.

The invention is not limited in its applicability to the particular salt solutions identified in the examples but is of equal value when using any salt or mixture of salts whose aqueous solution is a solvent for both monomeric and polymeric acrylonitrile.

I claim:

1. The improvement, in the process of polymerizing acrylonitrile while the latter is dissolved in an aqueous inorganic salt solution which is a solvent for the monomer and for the polymer, and in which the salt concentration is from 55 to 65 per cent by weight and the principal saline solute is zinc chloride, which consists in carrying out the process in such a medium containing from 0.02 to 1.0 part by weight of copper ions for each million parts by weight of the salt solution.

2. The improvement claimed in claim 1, wherein the aqueous salt solution contains zinc chloride as the principal solute, together with a lesser amount of calcium chloride.

3. The improvement claimed in claim 1, wherein the aqueous salt solution contains zinc chloride as the principal solute, together with a lesser amount of magnesium chloride.

4. The improvement claimed in claim 1, wherein the characterising salt in the aqueous salt solution consists essentially of zinc chloride.

References Cited in the file of this patent

UNITED STATES PATENTS

| 2,356,767 | Kropa | Aug. 29, 1944 |
| 2,379,431 | Fryling | July 3, 1945 |
| 2,477,784 | Britton et al. | Aug. 2, 1949 |
| 2,486,943 | Hammer et al. | Nov. 1, 1949 |
| 2,601,293 | Howard | June 24, 1952 |
| 2,648,647 | Stanton et al. | Aug. 11, 1953 |

FOREIGN PATENTS

| 599,472 | Great Britain | Mar. 12, 1948 |

OTHER REFERENCES

Boundy-Boyer: "Styrene," 285, 286 (Reinhold, 1950).